United States Patent
Marsh et al.

(10) Patent No.: US 12,240,990 B2
(45) Date of Patent: Mar. 4, 2025

(54) COATINGS WITH IMPROVED SCRATCH RESISTANCE

(71) Applicant: Eastman Chemical Company, Kingsport, TN (US)

(72) Inventors: Stacey James Marsh, Church Hill, TN (US); Philip Jerome Geiger, Kingsport, TN (US); John Evan Boisseau, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 980 days.

(21) Appl. No.: 17/250,990

(22) PCT Filed: Oct. 7, 2019

(86) PCT No.: PCT/US2019/054917
§ 371 (c)(1),
(2) Date: Apr. 8, 2021

(87) PCT Pub. No.: WO2020/076663
PCT Pub. Date: Apr. 16, 2020

(65) Prior Publication Data
US 2021/0348017 A1 Nov. 11, 2021

Related U.S. Application Data

(60) Provisional application No. 62/744,163, filed on Oct. 11, 2018.

(51) Int. Cl.
C09D 167/02 (2006.01)
C09D 7/20 (2018.01)
(52) U.S. Cl.
CPC ............. C09D 167/02 (2013.01); C09D 7/20 (2018.01)
(58) Field of Classification Search
CPC .............................. C09D 167/02; C09D 7/20
USPC ......................................................... 524/513
See application file for complete search history.

(56) References Cited

U.S. PATENT DOCUMENTS

| | | | |
|---|---|---|---|
| 4,397,989 A | 8/1983 | Adesko | |
| 5,474,811 A | 12/1995 | Rehfuss et al. | |
| 5,593,785 A | 1/1997 | Mayo et al. | |
| 8,163,850 B2 | 4/2012 | Marsh et al. | |
| 8,168,721 B2 | 5/2012 | Marsh et al. | |
| 9,029,460 B2 * | 5/2015 | Marsh ................ | C09D 133/062 524/502 |
| 9,029,461 B2 | 5/2015 | Marsh et al. | |
| 10,011,737 B2 | 7/2018 | Zhou et al. | |
| 10,676,565 B2 | 6/2020 | Zhou et al. | |
| 2005/0148704 A1 | 7/2005 | Weingartz | |
| 2007/0083014 A1 | 4/2007 | Boisseau et al. | |
| 2010/0204388 A1 | 8/2010 | Marsh et al. | |
| 2014/0242272 A1 | 8/2014 | Sherwood et al. | |
| 2014/0296406 A1 | 10/2014 | Marsh et al. | |
| 2016/0340471 A1 | 11/2016 | Zhou et al. | |
| 2017/0275492 A1 | 9/2017 | Zhou et al. | |
| 2018/0105640 A1 | 4/2018 | Zhou et al. | |
| 2021/0348016 A1 | 11/2021 | Zhou et al. | |
| 2021/0348017 A1 | 11/2021 | Marsh et al. | |
| 2021/0380835 A1 | 12/2021 | Geiger et al. | |
| 2022/0002579 A1 | 1/2022 | Zhou et al. | |

FOREIGN PATENT DOCUMENTS

| WO | WO-2016187095 A1 * | 11/2016 | ............. C08G 63/12 |
|---|---|---|---|
| WO | WO 2020-076661 A1 | 4/2020 | |
| WO | WO 2020-076664 A1 | 4/2020 | |

OTHER PUBLICATIONS

Notification of Transmittal of the International Search Report and the Written Opinion of the International Searching Authority, or the Declaration date of mailing Dec. 18, 2019 received in International Application No. PCT/US2019/054915.
Notification of Transmittal of the International Search Report and the Written Opinion of the International Searching Authority, or the Declaration date of mailing Jan. 2, 2020 received in International Application No. PCT/US2019/054917.
Notification of Transmittal of the International Search Report and the Written Opinion of the International Searching Authority, or the Declaration date of mailing Jan. 2, 2020 received in International Application No. PCT/US2019/054918.
Co-pending U.S. Appl. No. 17/250,989, filed Apr. 8, 2021; Zhou et al., now US Patent Publication No. 2021-0348016.
Co-pending U.S. Appl. No. 17/250,991, filed Apr. 8, 2021; Geiger et al., now US Patent Publication No. 2021-0380835.
Co-pending U.S. Appl. No. 17/475,890, filed Sep. 15, 2021; Zhou et al., now US Patent Publication No. 2022-0002579.
Resins for Surface Coatings, vol. II, p. 121-210, edited by P. Oldring and G. Hayward, SITA Technology, London, UK, 1987.
Resins for Surface Coatings, vol. III, p. 63-167, edited by P. Oldring and G. Hayward, SITA Technology, London, UK, 1987.
Bayer Material Science, The Chemistry of Polyurethane Coatings, Technical Publication p. 20, 2005.
Wicks et al., Organic Coatings, Science and Technology, 2nd edition, p. 246-257, Wiley-Interscience, New York, 1999.
USPTO Office Action dated Jan. 24, 2024 received in Co-pending U.S. Appl. No. 17/250,989.
USPTO Office Action dated Feb. 8, 2024 received in Co-pending U.S. Appl. No. 17/250,991.
USPTO Office Action dated Jan. 24, 2024 received in co-pending U.S. Appl. No. 17/475,890.

* cited by examiner

*Primary Examiner* — Kelechi C Egwim
(74) *Attorney, Agent, or Firm* — Judith C. Rawls

(57) ABSTRACT

This invention relates to aliphatic polyester resins for use in coatings. More particularly this invention relates to aliphatic polyester resins containing 2,2,4,4-tetramethyl-1,3-cyclobutanediol (TMCD) that exhibit improved scratch resistance when formulated into 1 K automotive clearcoats. These polyesters can be used as the sole resin in the clearcoat binder or in combination with carbamate-functional acrylic resins and/or hydroxyl-functional acrylic and polyester resins.

11 Claims, No Drawings

COATINGS WITH IMPROVED SCRATCH RESISTANCE

FIELD OF THE INVENTION

This invention relates to aliphatic polyester resins for use in coatings. More particularly this invention relates to aliphatic, polyester resins containing 2,2,4,4-tetraalkylcyclobutane-1,3-diol (TACD) that exhibit improved scratch resistance when formulated into 1K automotive clearcoats. These aliphatic polyesters can be used in combination with acrylic resins and/or other polyester resins and/or other suitable resins that are neither polyester nor acrylic but will react with a melamine crosslinker to improve scratch resistance without suffering a tradeoff in other clearcoat properties, such as hardness.

BACKGROUND OF THE INVENTION

One-component (1K) acrylic/melamine-crosslinked clearcoats were introduced by automotive manufacturers in the 1980's as part of the wet-on-wet body coating process. These clearcoats are still the most commonly used today due to their cost/performance balance relative to more expensive 2K polyurethane systems. Despite their good mechanical properties, 1K acrylic/melamine clearcoats suffered from poor scratch resistance. This results in a poor appearance for the automobile and translates to consumer dissatisfaction with the manufacturer.

There are two modes of damage with respect to clearcoat scratches, plastic deformation and fracture of the cured film. Plastic deformation or marring results from microabrasions, such as those experienced during automated car washes. These mars can reflow over time on exposure to heat from the sun due to elastic behavior of the clearcoat. Fractures or tears to the film, such as severe damage from keys, finger nails or tree limbs, are permanent and will not reflow. Soft clearcoats can be formulated to achieve viscoelastic flow to facilitate recovery after damage by marring. But they will likely be more susceptible to environmental etch and moisture (humidity) damage. Harder clearcoats can be formulated that are more resistant to fractures, chemicals and moisture, but appearance can suffer due to microabrasions that make the clearcoat look more diffuse, less mirror-like, over time. A combination of the two usually results in some tradeoffs in performance.

To improve 1K acrylic/melamine clearcoat scratch resistance, coating formulators often replace a portion of the acrylic resin with a 'softer' resin that has a low glass transition temperature. This soft resin may be another acrylic resin or a polyester. While the clearcoat scratch resistance due to plastic deformation can be improved, the hardness, chemical resistance and the ability to withstand deep scratches and fracture resistance can suffer.

Thus, a need exists for polymer resins that that exhibit improved scratch resistance when formulated into 1K automotive clearcoats without suffering a tradeoff in other clearcoat properties, such as hardness.

SUMMARY OF THE INVENTION

It has been found that aliphatic, polyester resins containing 2,2,4,4-tetraalkylcyclobutane-1,3-diol (TACD) and in particular 2,2,4,4-tetramethyl-1,3-cyclobutanediol (TMCD) exhibit improved scratch resistance when formulated into 1K acrylic/melamine automotive clearcoats. These aliphatic polyesters can be used in combination with acrylic resins and/or other polyester resins and/or other suitable resins that are neither polyester nor acrylic but will react with the melamine crosslinker to improve scratch resistance without suffering a tradeoff in other clearcoat properties, such as hardness.

The invention is as set forth in the appended claims.

The present invention provides a coating comprising:
A. about 2 to about 50 weight percent, based on the total weight of (A), (B) and (C) of a curable, aliphatic polyester resin, comprising:
   i. diacid residues, comprising at least 90 mole percent, based on the total moles of diacid residues, of the residues of at least one aliphatic diacid where 0 to 40 mole percent is an alicyclic diacid and 60 to 100 mole percent is a linear diacid containing between 4 and 12 carbons;
   ii. diol residues, comprising a) 25 to 100 mole percent, based on the total moles of diol residues, of the residues of 2,2,4,4-tetraalkylcyclobutane-1,3-diol (TACD) and b) 0 to 75 mole percent based on the total moles of diol residues, of a C2-C20 diol, based on the total moles of diol residues; and; and
   iii. about 5 to about 80 mole percent of the residues of at least one polyol selected from the group consisting of trimethylolpropane, pentaerythritol, trimethylolethane, erythritol, threitol, dipentaerythritol, sorbitol, and glycerine, based on the total moles of diol and polyol residues;
B. about 15 to about 85 weight percent, based on the total weight of (A), (B), and (C) of at least one acrylic copolymer of ethylenically unsaturated monomers containing carbamate and/or hydroxy functional groups;
C. about 10 to about 50 weight percent, based on the total weight of (A), (B), and (C), of at least one crosslinker comprising at least one compound reactive with a carbamate and/or hydroxyl group; and
D. about 10 to about 60 weight percent, based on the total weight of (A), (B), (C), and (D) of at least one non-aqueous solvent.

The present invention also provides a coating comprising:
A. about 2 to about 50 weight percent, based on the total weight of (A), (B) and (C) of a curable, aliphatic polyester resin, comprising:
   i. diacid residues, comprising at least 90 mole percent, based on the total moles of diacid residues, of the residues of at least one aliphatic diacid where 0 to 40 mole percent is an alicyclic diacid and 60 to 100 mole percent is a linear diacid containing between 4 and 12 carbons;
   ii. diol residues, comprising a) 25 to 100 mole percent, based on the total moles of diol residues, of the residues of 2,2,4,4-tetramethylcyclobutane-1,3-diol (TMCD) and b) 0 to 75 mole percent based on the total moles of diol residues, of a C2-C20 diol, based on the total moles of diol residues; and
   iii. about 5 to about 80 mole percent of the residues of at least one polyol selected from the group consisting of trimethylolpropane, pentaerythritol, trimethylolethane, erythritol, threitol, dipentaerythritol, sorbitol, and glycerine, based on the total moles of diol and polyol residues;
B. about 15 to about 85 weight percent, based on the total weight of (A), (B), and (C) of at least one acrylic copolymer of ethylenically unsaturated monomers containing carbamate and/or hydroxy functional groups;
C. about 10 to about 50 weight percent, based on the total weight of (A), (B), and (C), of at least one crosslinker comprising at least one compound reactive with a carbamate and/or hydroxyl group; and D. about 10 to about 60 weight percent, based on the total weight of (A), (B), (C), and (D) of at least one non-aqueous solvent.

DETAILED DESCRIPTION

Unless otherwise indicated, all numbers expressing quantities of ingredients, properties such as molecular weight, reaction conditions, and so forth used in the specification and claims are to be understood as being modified in all instances by the term." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ diols", is intended to specifically include and disclose $C_1$, $C_2$, $C_3$, $C_4$ and $C_5$ diols.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to a "polyester," a "dicarboxylic acid", a "residue" is synonymous with "at least one" or "one or more" polyesters, dicarboxylic acids, or residues and is thus intended to refer to both a single or plurality of polyesters, dicarboxylic acids, or residues. In addition, references to a composition "comprising", "containing", "having" or "including" "an" ingredient or "a" polyester is intended to include other ingredients or other polyesters, respectively, in addition to the specifically identifed ingredient or residue. Accordingly, the terms "containing", "having" or "including" are intended to be synonymous and may be used interchangably with the term "comprising", meaning that at least the named compound, element, particle, or method step, etc., is present in the composition or article or method, but does not exclude the presence of other compounds, catalysts, materials, particles, method steps, etc, even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

The term "curable, aliphatic polyester", as used herein, is synonymous with the term "resin" and is intended to mean a thermosetting surface coating polymer prepared by the polycondensation of one or more acid components and hydroxyl components. The curable, aliphatic polyester of the present invention is a thermoset polymer and is suitable as a resin for solvent-based coatings and more specifically mono-coat applications. This polyester has a low molecular weight, typically 500 to 10,000 daltons, and would not be suitable for fabrication films, sheets, and other shaped objects by extrusion, casting, blow molding, and other thermoforming processes commonly used for high molecular weight thermoplastic polymers. The polyester has a reactive functional group, typically a hydroxyl group or carboxyl group for the purpose of later reacting with a crosslinker in a coating formulation. The functional group is controlled by having either excess diol or acid (from dicarboxylic acid or tricarboxylic acid) in the polyester resin composition. The desired crosslinking pathway will determine whether the polyester resin will be hydroxyl-terminated or carboxylic acid-terminated. This concept is known to those skilled in the art and described, for example, in *Organic Coatings Science and Technology*, 2nd ed., p. 246-257, by Z. Wicks, F. Jones, and S. Pappas, Wiley, New York, 1999, the entire disclosure of which is incorporated herein by reference.

Typically, the acid component comprises at least one dicarboxylic acid and may, optionally, include mono- and polybasic carboxylic acids. For example, the curable, aliphatic polyester may be prepared from an acid component comprising an aliphatic or cycloaliphatic dicarboxylic acid such as, for example, adipic acid or 1,3-cyclohexanedicarboxylic acid, or a mixture of one or more aliphatic and cycloaliphatic acids. The hydroxyl component comprises diols and polyols. The diols may comprise one or more cycloaliphatic diols such as, for example, 2,2,4,4-tetramethyl-1,3-cyclobutanediol, either alone or in combination with one or more linear or branched aliphatic diols such as, for example, neopentyl glycol. Catalysts may be used to accelerate the rate of the polycondensation reaction. Additional examples of acid components and hydroxyl components, other than TMCD of the curable, aliphatic polyester include those known in the art including, but not limited to, those discussed below, and in various documents known in the art such as, for example, in *Resins for Surface Coatings*, Vol. III, p. 63-167, ed. by P. K. T. Oldring and G. Hayward, SITA Technology, London, U K, 1987, the disclosure of which is incorporated herein by reference.

The term "residue", as used herein in reference to the polymers of the invention, means any organic structure incorporated into a polymer through a polycondensation or ring opening reaction involving the corresponding monomer. It will also be understood by persons having ordinary skill in the art, that the residues associated within the various curable polyesters of the invention can be derived from the parent monomer compound itself or any derivative of the parent compound. For example, the dicarboxylic acid residues referred to in the polymers of the invention may be derived from a dicarboxylic acid or its associated acid halides, esters, salts, anhydrides, or mixtures thereof. Thus, as used herein, the term "dicarboxylic acid" is intended to include dicarboxylic acids and any derivative of a dicarboxylic acid, including its associated acid halides, esters, half-esters, salts, half-salts, anhydrides, and mixtures thereof, useful in a polycondensation process with a diol to make a curable, aliphatic polyester.

The term "aliphatic" is intended to have its common meaning as would be understood by persons having ordinary skill in the art, that is, acyclic or cyclic, saturated or unsaturated carbon compounds, excluding benzenoid or other aromatic systems. The term "cycloaliphatic", as used herein, is intended to mean an aliphatic, cyclic compound. The term "aliphatic polyester", as used herein, is understood to mean a polyester that contains 90 mole percent or greater aliphatic diacid or diol residues, based on the total moles of diacid or diol residues. Small amounts, such as less than 10 mole %, or less than 9 mole %, or less than 8 mole %, or less than 5 mole %, or less than 3 mole %, or less than 2 mole %, or less than 1 mole % of aromatic dicarboxylic acids residues or aromatic diol residues also may be present in the curable, aliphatic polyester. Desirably, the curable, aliphatic polyester is essentially free, i.e., having less than 1 mole % of aromatic diacid and/or aromatic diol residues.

This invention relates to thermosetting automotive 1K clearcoats containing aliphatic polyester resins containing an aliphatic dibasic acid and 2,2,4,4-tetraalkylcyclobutane-1,3-diol (TACD) and in particular and 2,2,4,4-tetramethyl-1,3-cyclobutanediol (TMCD). The resin may be modified with various aliphatic dibasic acids, diols and polyols. We have found that the aliphatic polyesters exhibit a combination of scratch resistance and hardness. The aliphatic polyester resin has a number average molecular weight ($M_n$) from about 500 to 10,000, preferably from about 750 to 5,000, preferably from about 1,000 to 3,500 and a glass transition temperature ($T_g$) from about −50° C. to 35° C. preferably from about −40° C. to 30° C., preferably from about −30° C. to 20° C. and hydroxyl groups from about 50 mg KOH/g resin to 500 mg KOH/g resin preferably from about 100 mg KOH/g resin to 350 mg KOH/g resin, preferably from about 150 mg KOH/g resin to 250 mg KOH/g resin and an acid number from about 0 mg KOH/g resin to 100 mg KOH/g resin preferably from about 1 mg KOH/g resin to 50 mg KOH/g resin, preferably from about 5 mg KOH/g resin to 15 mg KOH/g resin.

In one embodiment, the 1K clearcoat of this invention is comprised of:
A. about 2 to about 50 weight percent, based on the total weight of (A), (B) and (C) of a curable, aliphatic polyester resin described above, comprising:
 i. diacid residues, comprising at least 90 mole percent, based on the total moles of diacid residues, of the residues of at least one aliphatic diacid where 0 to 40 mole percent is an alicyclic diacid and 60 to 100 mole percent is a linear diacid containing between 4 and 12 carbons.
 ii. diol residues, comprising a) 25 to 100 mole percent, based on the total moles of diol residues, of the residues of 2,2,4,4-tetraalkylcyclobutane-1,3-diol (TACD) and b) 0 to 75 mole percent based on the total moles of diol residues, of a C2-C20 diol, based on the total moles of diol residues; and
 iii. about 5 to about 80 mole percent of the residues of at least one polyol chosen from trimethylolpropane, pentaerythritol, trimethylolethane, erythritol, threitol, dipentaerythritol, sorbitol, and glycerine, based on the total moles of diol and polyol residues;
B. about 15 to about 85 weight percent, based on the total weight of (A), (B), and (C) of at least one acrylic copolymer of ethylenically unsaturated monomers containing carbamate and/or hydroxy functional groups;
C. about 10 to about 50 weight percent, based on the total weight of (A), (B), and (C), of at least one crosslinker comprising at least one compound reactive with a carbamate and/or hydroxyl group; and
D. about 10 to about 60 weight percent, based on the total weight of (A), (B), (C), and (D) of at least one non-aqueous solvent.

The 1K clearcoat composition crosslinker (C) comprises at least one melamine compound chosen from hexamethoxymethyl melamine, tetramethoxymethyl benzoguanamine, tetramethoxymethyl urea, and mixed butoxy/methoxy substituted melamines and the like.

In another aspect, this invention further provides a curable coating composition further comprising one or more crosslinking catalysts. Useful catalysts may include p-toluenesulfonic acid, dodecylbenzene sulfonic acid, dinonylnaphthalene sulfonic acid, and dinonylnaphthalene disulfonic acid. These catalysts may be amine blocked or unblocked. Useful amounts of catalyst will be about 0.01 to 5%, based on the total weight of the resin solids.

The 1K clearcoat non-aqueous solvent (D) comprises benzene, xylene, mineral spirits, naptha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, 2,2,4-trimethyl-1,3-pentanediol monoisobutyrate, or combinations thereof. The 1K clearcoat further may optionally comprises at coating additive such as leveling agents, rheology agents, flow control agents, plasticizers, flatting agents, pigment wetting and dispersing agents, crosslinking catalysts, pigments, dyes, ultraviolet light absorbers, ultraviolet light stabilizers, defoaming agents, antifoaming agents, anti-settling agents, anti-sag or sag control agents, bodying agents, anti-skinning agents, anti-flooding agents, anti-floating agents, and corrosion inhibitors used alone or in commbination.

TACD is a diol and can be represented by the general structure:

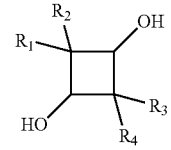

wherein R1, R2, R3, and R4 each independently represent an alkyl radical, for example, a lower alkyl radical having 1 to 8 carbon atoms; or 1 to 6 carbon atoms, or 1 to 5 carbon atoms, or 1 to 4 carbon atoms, or 1 to 3 carbon atoms, or 1 to 2 carbon atoms, or 1 carbon atom. The alkyl radicals may be linear, branched, or a combination of linear and branched alkyl radicals. Examples of TACD include 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4- diethylcyclobutane-1,3-diol, 2-ethyl-2,4,4-trimethylcyclobutane-1,3-diol, 2,4-dimethyl-2,4-diethyl-cyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol. TMCD is most preferred.

The diols in (ii) have 2 hydroxyl groups and can be branched or linear, saturated or unsaturated, aliphatic or cycloaliphatic $C_2$-$C_{20}$ compounds, the hydroxyl groups being primary, secondary, and/or tertiary, desirably primary. Examples of diols (b) include 2,2-dimethyl-1,3-propanediol (neopentyl glycol), 1,2 cyclohexanedimethanol, 1,3-cyclohexanedimethanol, 1,4 cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, ethylene glycol, propylene glycol, diethylene glycol, dipropylene glycol, triethylene glycol, tetraethylene glycol, polyethylene glycol, and 2,2-bis(hydroxymethyl)propionic acid (dimethylolpropionic acid).

Desirably, the diols (ii) are 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, and 1,6-hexanediol or mixtures thereof. Desirably, at least one of the diols is neopentyl glycol.

The polyols in (iii) having 3 or more hydroxyl groups can be saturated or unsaturated, aliphatic or cycloaliphatic $C_2$-$C_{20}$ compounds, the hydroxyl groups being primary, secondary, and/or tertiary, and desirably at least two of the hydroxyl groups are primary. Desirably, the polyols are hydrocarbons and do not contain atoms other than hydrogen, carbon and oxygen. Examples of the polyol include 1,1,1-trimethylolpropane (TMP), 1,1,1-trimethylolethane, glycerin, pentaerythritol, erythritol, threitol, di-pentaerythritol, sorbitol, mixtures thereof, and the like. Desirably, the polyol is TMP.

The alicyclic diacid in (i) is a cyclic aliphatic dicarboxylic acid compound, its diester derivative, its anhydride, or a combination thereof. Suitable alicyclic diacid compounds include compounds having two carboxylic acid groups, their diester derivatives, and their anhydrides. The dicarboxylic acid compounds can form ester linkages with diol or polyol compounds. For example, a polyester can be synthesized by using a polyhydroxyl compound and a derivative of a dicarboxylic acid such as, for example, dimethyl ester or other dialkyl esters of the diacid, or diacid chloride or other diacid halides, or acid anhydride.

Suitable alicyclic diacids include, but are not limited to, 1,4 cyclohexanedicarboxylic acid, 1,3 cyclohexanedicarboxylic acid, hexahydrophthalic anhydride (HHPA), methyl hexahydrophthalic anhydride, tetrahydrophthalic anhydride, tetrachlorophthalic anhydride, 5-norbornene-2,3-dicarboxylic anhydride, 5-norbornene-2,3-dicarboxylic acid, 2,3-norbornanedicarboxylic acid, 2,3-norbornanedicarboxylic acid anhydride, and mixtures thereof. HHPA is the most desired alicyclic diacid.

The acyclic aliphatic diacid in (i) is an open-chain aliphatic dicarboxylic acid compound, its diester derivative, its anhydride, or a combination thereof. Examples of acyclic aliphatic diacids include succinic acid, glutaric acid, adipic acid, itaconic anhydride, itaconic acid, citraconic anhydride, citraconic acid, pimelic acid, suberic acid, dodecanedioic acid, sebacic acid, azelaic acid, and the like.

The number average molecular weight (Mn) of the curable polyester A of the present invention may be from 500 to 10,000, from 750 to 5,000, or from 1,000 to 3,500 g/mole. The weight average molecular weight (Mw) of the curable polyester of the present invention may be from 1,000 to 10,000, from 1,500 to 6,000, or from 2,000 to 4,000 g/mole. Molecular weights are measured by gel permeation chromatography (GPC) using polystyrene equivalent molecular weight.

Stoichiometric calculations for the polyester resin and melamine reaction are known to those skilled in the art and are described in The Chemistry of Coatings, Technical Publication p. 20, by Bayer Material Science, 2005, incorporated herein by reference. Theoretically, crosslinking between the polyester resin and the melamine reaches maximum molecular weight and optimal properties associated with molecular weight when one equivalent of melamine (—OR) reacts with one equivalent of hydroxyl (OH), which is when the (—OR) to OH ratio is 1.0/1.0.

Some examples of UV absorbers and UV light stabilizers are substituted benzophenone, substituted benzotriazoles, hindered amines, and hindered benzoates, available from Cytec Specialty Chemicals as CYASORB® UV, and available from Ciba Specialty Chemicals as TINUVIN®; diethyl-3acetyl-4-hydroxy-benzyl-phosphonate, 4-dodecyloxy-2-hydroxy benzophenone, and resorcinol monobenzoate.

The substrate to which this inventive coating may be applied may include any common substrate such as paper; polymer films such as polyethylene or polypropylene; wood; metals such as aluminum, steel or galvanized sheeting; glass; urethane elastomers; primed (painted) substrates; and the like. The coating composition can be coated onto a substrate using techniques known in the art, for example, by spraying, draw-down, roll-coating, etc., to form a dried coating having a thickness of about 0.1 to about 4 mils (1 mil=25 μm), or 0.5 to 3, or 0.5 to 2, or 0.5 to 1 mils on the substrate. The coating can be cured at ambient (room) temperature or heated to a temperature of about 120° C. to about 200° C., for a period that typically ranges about 10 to about 90 minutes and allowed to cool.

The coating composition in this invention report is particularly well suited for automotive OEM (Original Equipment Manufacturer) clearcoat applications. Current commercial carbamate technology has taken automotive finishes to its current leading level of scratch and mar resistance in the polyol/melamine technology. The addition of TACD chemistry can greatly improve clear coat scratch performance in automotive finishes.

EXAMPLES

The present invention is illustrated in greater detail by the specific examples presented below. It is to be understood that these examples are illustrative embodiments and are not intended to be limiting of the invention, but rather are to be construed broadly within the scope and content of the appended claims. All parts and percentages in the examples are on a weight basis unless otherwise stated.

Polyester Examples 1-4

The polyester resin compositions in Table 1 were prepared as follows.

Polyester Example 1

The resin was prepared using a solvent process in a two-liter reaction kettle equipped with a heating mantle, mechanical stirrer, thermocouple, nitrogen blanket (1.0 scfh), oil-heated partial condenser (103° C.-105° C.), condensate trap, and water-cooled total condenser (15° C.). TMP (half of total), NPG, AD, triphenylphosphite (0.05 wt. % based on total charge), catalyst (0.025 wt. % based on total charge) and xylene (2.5 wt. wt. % based on total charge) were added to the kettle. Additional xylene was used to fill the trap. The kettle was heated to 150° C. over 125 minutes to form a homogeneous melt. Agitation (300 rpm) was started. The reaction mixture was heated to 170° C. over 40 minutes. The remaining TMP was added when half of the water of esterification was obtained. The reaction mixture was then heated to 220° C. over 2 hours and held until a final acid number of 4-8 mg KOH/g resin was achieved. The resin was cooled to 190° C. and filter through a medium mesh filter into paint can. The determined resin properties were acid number 7, hydroxyl number 151, $M_n$ 2528 and $T_g$-41° C.

Polyester Example 2

The resin was prepared using a solvent process in a two-liter reaction kettle equipped with a heating mantle, mechanical stirrer, thermocouple, nitrogen blanket (1.0 scfh), oil-heated partial condenser (103° C.-105° C.), condensate trap, and water-cooled total condenser (15° C.). TMP (half of total), NPG, TMCD, AD, triphenylphosphite (0.1 wt. % based on total charge), catalyst (0.025 wt. % based on total charge) and xylene (2.5 wt. wt. % based on total charge) were added to the kettle. Additional xylene was used to fill the trap. The kettle was heated to 150° C. over 125 minutes to form a homogeneous melt. Agitation (300 rpm) was started. The reaction mixture was heated to 170° C. over 40 minutes. The remaining TMP was added when half of the water of esterification was obtained. The reaction mixture was then heated to 220° C. over 2 hours and held until a final acid number of 4-8 mg KOH/g resin was achieved. The resin was cooled to 190° C. and filter through a medium mesh filter into paint can. The determined resin properties were acid number 8, hydroxyl number 158, $M_n$ 2315 and $T_g$-31° C.

Polyester Example 3

The resin was prepared using a solvent process in a two-liter reaction kettle equipped with a heating mantle, mechanical stirrer, thermocouple, nitrogen blanket (1.0 scfh), oil-heated partial condenser (103° C.-105° C.), condensate trap, and water-cooled total condenser (15° C.). TMP (half of total), TMCD, AD, triphenylphosphite (0.1 wt. % based on total charge), catalyst (0.025 wt. % based on total charge) and xylene (2.5 wt. wt. % based on total charge) were added to the kettle. Additional xylene was used to fill the trap. The kettle was heated to 150° C. over 125 minutes to form a homogeneous melt. Agitation (300 rpm) was started. The reaction mixture was heated to 170° C. over 40 minutes. The remaining TMP was added when half of the water of esterification was obtained. The reaction mixture was then heated to 220° C. over 2 hours and held until a final acid number of 4-8 mg KOH/g resin was achieved. The resin was cooled to 190° C. and filter through a medium mesh filter into paint can. The determined resin properties were acid number 8, hydroxyl number 155, $M_n$ 2336 and $T_g$-20° C.

Polyester Example 4

The resin was prepared using a solvent process in a two-liter reaction kettle equipped with a heating mantle, mechanical stirrer, thermocouple, nitrogen blanket (1.0 scfh), oil-heated partial condenser (103° C.-105° C.), condensate trap, and water-cooled total condenser (15° C.). HHPA, TMP (half of total), TMCD, AD, triphenylphosphite (0.1 wt. % based on total charge), catalyst (0.05 wt. % based on total charge) and xylene (2.5 wt. wt. % based on total charge) were added to the kettle. Additional xylene was used to fill the trap. The kettle was heated to 130° C. over 105 minutes to form a homogeneous melt. Agitation (300 rpm) was started. The reaction mixture was heated to 170° C. by the reaction exotherm. The reaction mixture was then heated to 200° C. over 60 minutes and held until an acid number less than or equal to 214 mg KOH/g resin was obtained. Next, the resin was cooled to 185° C. where the NPG and remaining TMP were added. The reaction mixture was then heated to 230° C. over 2 hours and held until a final acid number of 5-8 mg KOH/g resin was achieved. The resin was cooled to 190° C. and filter through a medium mesh filter into paint can. The determined resin properties were acid number 8, hydroxyl number 144, $M_n$ 2047 and $T_g$-16° C.

TABLE 1

Example Polyester Resins Varying in TMCD Content

| | Example | | | |
|---|---|---|---|---|
| | PE Example 1 | PE Example 2 | PE Example 3 | PE Example 4 |
| Total monomer mol % | | | | |
| NPG | 34.00 | 16.53 | 0.00 | 21.01 |
| TMCD | 0.00 | 16.53 | 32.13 | 15.21 |
| TMP | 19.33 | 20.48 | 21.62 | 17.40 |
| HHPA | 0.00 | 0.00 | 0.00 | 14.84 |
| AD | 46.66 | 46.45 | 46.25 | 31.54 |
| Calculation constants | | | | |
| OHN | 172 | 172 | 172 | 156 |
| $f_{OH}$ | 4.00 | 4.00 | 4.00 | 3.62 |
| OHEW | 325.00 | 325.00 | 325.00 | 359 |
| $M_n$ | 1300 | 1300 | 1300 | 1300 |
| AN | 10 | 10 | 10 | 10 |

Clearcoat Examples 1-4

Polyester Examples 1-4 were formulated into 1K melamine-crosslinked clearcoats as shown in Table 2. The clearcoat was then spray applied directly to a substrate that was precoated with an electrocoat, primer (or basecoat 1) and basecoat (basecoat 2). The clearcoats were flashed for 10 minutes at room temperature and then cured in a forced-air oven at 140° C. for 30 minutes.

The clearcoats were tested for König pendulum hardness (ASTM D 4366), forward impact resistance (ASTM D 2794) and nanoscratch resistance (Table 2). The nanoscratch test was performed using a Bruker Hysitron TI 980 Triboindenter.

The results show that clearcoats (CC Examples 2-4) made from polyester resins containing TMCD have a better combination of hardness, impact resistance and nanoscratch resistance than CC Example 1, which does not contain TMCD. PE Example 1, used in CC Example 1, would represent a typical polyester used by those skilled in the art to improve scratch resistance. While improving scratch resistance, the resulting hardness is unacceptable.

TABLE 2

Example Clearcoats Varying in TMCD Content

|  | CC Example 1 | CC Example 2 | CC Example 3 | CC Example 4 |
|---|---|---|---|---|
| Example polyester |  |  |  |  |
| PE Example 1 | 64.00 |  |  |  |
| PE Example 2 |  | 64.00 |  |  |
| PE Example 3 |  |  | 64.00 |  |
| PE Example 4 |  |  |  | 64.00 |
| Setamine US138 | 59.80 | 59.80 | 59.80 | 59.80 |
| BYK 331 | 0.13 | 0.13 | 0.13 | 0.13 |
| BYK 306 | 0.13 | 0.13 | 0.13 | 0.13 |
| BYK 392 | 0.67 | 0.67 | 0.67 | 0.67 |
| Nacure 5414 | 5.37 | 5.37 | 5.37 | 5.37 |
| Setal 91760 | 48.00 | 48.00 | 48.00 | 48.00 |
| Xylene | 6.72 | 6.72 | 6.72 | 6.72 |
| BGA | 6.72 | 6.72 | 6.72 | 6.72 |
| PMA/Butanol 50/50 | 11.72 | 11.72 | 11.72 | 11.72 |
| MAK | 6.72 | 6.72 | 6.72 | 6.72 |
| S150 | 6.72 | 6.72 | 6.72 | 6.72 |
| BA | 12.72 | 12.72 | 12.72 | 12.72 |
| UVA Tinuvin 1130 | 2.10 | 2.10 | 2.10 | 2.10 |
| HALS Tinuvin 123 | 1.05 | 1.05 | 1.05 | 1.05 |
| Clearcoat properties |  |  |  |  |
| König pendulum hardness, sec | 58 | 83 | 113 | 116 |
| Forward impact, in. - lbs. | 90 | 50 | 50 | 50 |
| Nanoscratch |  |  |  |  |
| Residual indent depth at 5N, μm | 3.20 | 2.70 | 3.70 | 3.70 |
| Fracture resistance, N | 14.50 | 15.50 | 12.80 | 18.30 |
| Nano-indentation hardness, MPa | 73.00 | 141.00 | 154.00 | 253.00 |

In Table 2, BYK 331, BYK 306 and BYK 392 are coaing system additives available commercially from BYK-Chemie GmbH. Nacure 5414 is a polymeric blocked sulfonic acid ester catalyst for use with amino crosslinking resins available commercially from King Inducties, Inc. Setal 91760 is SETALUX® 91760 SS-53 a thermosetting hydroxylated acrylic copolymer for combination with amino resins, modified with sag control agent available from Allnex. BGA is butyl glycol acetate. PMA is phorbol 12-myristate 13-acetate. MAK is Methyl n-Amyl Ketone. S150 is SOLVESSO 150 mixed solvent available from ExxonMobile Corporation. BA is n-butyl acetate. UVA 1130 is TINUVIN 1130 ultraviolet light absorber available from BASF. HALS 123 is TINUVIN 123, Hindered-Amine Light Stabilizers (HALS) available from BASF.

Polyester Examples 5-10

The polyester resin compositions in Table 3 were prepared as follows.

Polyester Example 5

The resin was prepared using a solvent process in a two-liter reaction kettle equipped with a heating mantle, mechanical stirrer, thermocouple, nitrogen blanket (1.0 scfh), oil-heated partial condenser (103° C.-105° C.), condensate trap, and water-cooled total condenser (15° C.). TMP (half of total), NPG, adipic acid, triphenylphosphite (0.05 wt. % based on total charge), catalyst (0.025 wt. % based on total charge) and xylene (2.5 wt. wt. % based on total charge) were added to the kettle. Additional xylene was used to fill the trap. The kettle was heated to 150° C. over 125 minutes to form a homogeneous melt. Agitation (300 rpm) was started. The reaction mixture was heated to 170° C. over 40 minutes. The remaining TMP was added when half of the water of esterification was obtained. The reaction mixture was then heated to 220° C. over 2 hours and held until a final acid number of 4-8 mg KOH/g resin was achieved. The resin was cooled to 190° C. and filter through a medium mesh filter into paint can. The determined resin properties were acid number 8, hydroxyl number 177, $M_n$ 1694 and $T_g$ -44° C.

Polyester Example 6

The resin was prepared using a solvent process in a two-liter reaction kettle equipped with a heating mantle, mechanical stirrer, thermocouple, nitrogen blanket (1.0 scfh), oil-heated partial condenser (103° C.-105° C.), condensate trap, and water-cooled total condenser (15° C.). TMP (half of total), TMCD, succinic acid, triphenylphosphite (0.05 wt. % based on total charge), catalyst (0.025 wt. % based on total charge) and xylene (2.5 wt. wt. % based on total charge) were added to the kettle. Additional xylene was used to fill the trap. The kettle was heated to 150° C. over 125 minutes to form a homogeneous melt. Agitation (300 rpm) was started. The reaction mixture was heated to 170° C. over 40 minutes. The remaining TMP was added when half of the water of esterification was obtained. The reaction mixture was then heated to 220° C. over 2 hours and held until a final acid number of 4-8 mg KOH/g resin was achieved. The resin was cooled to 190° C. and filter through a medium mesh filter into paint can. The determined resin properties were acid number 7, hydroxyl number 170, $M_n$ 2072 and $T_g$ 8° C.

Polyester Example 7

The resin was prepared using a solvent process in a two-liter reaction kettle equipped with a heating mantle, mechanical stirrer, thermocouple, nitrogen blanket (1.0 scfh), oil-heated partial condenser (103° C.-105° C.), condensate trap, and water-cooled total condenser (15° C.). TMP (half of total), TMCD, adipic acid, triphenylphosphite (0.05 wt. % based on total charge), catalyst (0.025 wt. % based on total charge) and xylene (2.5 wt. wt. % based on total charge) were added to the kettle. Additional xylene was used to fill the trap. The kettle was heated to 150° C. over 125 minutes to form a homogeneous melt. Agitation (300 rpm) was started. The reaction mixture was heated to 170° C. over 40 minutes. The remaining TMP was added when half of the water of esterification was obtained. The reaction mixture was then heated to 220° C. over 2 hours and held until a final acid number of 4-8 mg KOH/g resin was achieved. The resin was cooled to 190° C. and filter through a medium mesh filter into paint can. The determined resin properties were acid number 7, hydroxyl number 180, $M_n$ 2193 and $T_g$ -23° C.

Polyester Example 8

The resin was prepared using a solvent process in a two-liter reaction kettle equipped with a heating mantle, mechanical stirrer, thermocouple, nitrogen blanket (1.0 scfh), oil-heated partial condenser (103° C.-105° C.), condensate trap, and water-cooled total condenser (15° C.). TMP (half of total), TMCD, 1,4-cyclohexanedicarboxylic acid, triphenylphosphite (0.05 wt. % based on total charge), catalyst (0.025 wt. % based on total charge) and xylene (2.5 wt. wt. % based on total charge) were added to the kettle. Additional xylene was used to fill the trap. The kettle was heated to to 150° C. over 125 minutes to form a homogeneous melt. Agitation (300 rpm) was started. The reaction mixture was heated to 170° C. over 40 minutes. The remaining TMP was added when half of the water of esterification was obtained. The reaction mixture was then heated to 220° C. over 2 hours and held until a final acid number of 4-8 mg KOH/g resin was achieved. The resin was cooled to 190° C. and filter through a medium mesh filter into paint can. The determined resin properties were acid number 6, hydroxyl number 186, $M_n$ 2074 and $T_g$ 32° C.

Polyester Example 9

The resin was prepared using a solvent process in a two-liter reaction kettle equipped with a heating mantle, mechanical stirrer, thermocouple, nitrogen blanket (1.0 scfh), oil-heated partial condenser (103° C.-105° C.), condensate trap, and water-cooled total condenser (15° C.). TMP (half of total), TMCD, azelaic acid, triphenylphosphite (0.05 wt. % based on total charge), catalyst (0.025 wt. % based on total charge) and xylene (2.5 wt. wt. % based on total charge) were added to the kettle. Additional xylene was used to fill the trap. The kettle was heated to to 150° C. over 125 minutes to form a homogeneous melt. Agitation (300 rpm) was started. The reaction mixture was heated to 170° C. over 40 minutes. The remaining TMP was added when half of the water of esterification was obtained. The reaction mixture was then heated to 220° C. over 2 hours and held until a final acid number of 4-8 mg KOH/g resin was achieved. The resin was cooled to 190° C. and filter through a medium mesh filter into paint can. The determined resin properties were acid number 6, hydroxyl number 177, $M_n$ 1684 and $T_g$-37° C.

Polyester Example 10

The resin was prepared using a solvent process in a two-liter reaction kettle equipped with a heating mantle, mechanical stirrer, thermocouple, nitrogen blanket (1.0 scfh), oil-heated partial condenser (103° C.-105° C.), condensate trap, and water-cooled total condenser (15° C.). TMP (half of total), TMCD, dodecanedioc acid, triphenylphosphite (0.05 wt. % based on total charge), catalyst (0.025 wt. % based on total charge) and xylene (2.5 wt. wt. % based on total charge) were added to the kettle. Additional xylene was used to fill the trap. The kettle was heated to 150° C. over 125 minutes to form a homogeneous melt. Agitation (300 rpm) was started. The reaction mixture was heated to 170° C. over 40 minutes. The remaining TMP was added when half of the water of esterification was obtained. The reaction mixture was then heated to 220° C. over 2 hours and held until a final acid number of 4-8 mg KOH/g resin was achieved. The resin was cooled to 190° C. and filter through a medium mesh filter into paint can. The determined resin properties were acid number 5, hydroxyl number 176, $M_n$ 2690 and $T_g$-41° C.

TABLE 3

Example Polyester Resins With Varying Dibasic Acid Content

| | Example | | | | | |
|---|---|---|---|---|---|---|
| | PE Example 5 | PE Example 6 | PE Example 7 | PE Example 8 | PE Example 9 | PE Example 10 |
| Total monomer mol % | | | | | | |
| NPG | 38.18 | 0.00 | 0.00 | 0.00 | 0.00 | 0.00 |
| TMCD | 0.00 | 37.87 | 36.55 | 35.37 | 34.59 | 32.83 |
| TMP | 16.92 | 17.35 | 19.24 | 20.95 | 22.03 | 24.62 |
| Succinic acid ($C_4$) | 0.00 | 44.78 | 0.00 | 0.00 | 0.00 | 0.00 |
| Adipic acid ($C_6$) | 44.90 | 0.00 | 44.21 | 0.00 | 0.00 | 0.00 |
| Azelaic acid ($C_9$) | 0.00 | 0.00 | 0.00 | 0.00 | 43.38 | 0.00 |
| Dodecandioc acid ($C_{12}$) | 0.00 | 0.00 | 0.00 | 0.00 | 0.00 | 42.55 |
| 1,4-CHDA (cyclic $C_6$) | 0.00 | 0.00 | 0.00 | 43.69 | 0.00 | 0.00 |
| Calculation constants | | | | | | |
| OHN | 187 | 187 | 187 | 187 | 187 | 187 |
| $f_{OH}$ | 3.65 | 3.65 | 3.65 | 3.65 | 3.65 | 3.65 |
| OHEW | 300 | 300 | 300 | 300 | 300 | 300 |
| $M_n$ | 1095 | 1095 | 1095 | 1095 | 1095 | 1095 |
| AN | 0 | 0 | 0 | 0 | 0 | 0 |

Clearcoat Examples 5 Through 10

Polyester Examples 5-10 were formulated into 1K melamine-crosslinked clearcoats as shown in Table 4. The clearcoats were then spray applied directly to a substrate that was precoated with an electrocoat, primer (or basecoat 1) and basecoat (basecoat 2). The clearcoats were flashed for 10 minutes at room temperature and then cured in a forced-air oven at 140° C. for 30 minutes.

The clearcoats were tested for König pendulum hardness (ASTM D 4366) and nanoscratch resistance (Table 4). The nanoscratch test was performed using a Bruker Hysitron TI 980 Triboindenter.

The results show that clearcoats (CC Examples 6-10) made from polyester resins containing TMCD have a better combination of hardness and nanoscratch resistance than CC Example 5, which does not contain TMCD. PE Example 5, used in CC Example 5, would represent a typical polyester used by those skilled in the art to improve scratch resistance. While improving scratch resistance, the resulting hardness is unacceptable. Furthermore, linear aliphatic acids of varying carbon length ($C_4$ to $C_{12}$) can be used in combination with TMCD to balance the hardness and nanooscratch resistance as needed.

TABLE 4

Example Clearcoats With Varying Dibasic Acid Content

| | Example | | | | | |
|---|---|---|---|---|---|---|
| | CC Example 5 | CC Example 6 | CC Example 7 | CC Example 8 | CC Example 9 | CC Example 10 |
| Example polyester | | | | | | |
| PE Example 5 | 64.00 | | | | | |
| PE Example 6 | | 64.00 | | | | |

TABLE 4-continued

Example Clearcoats With Varying Dibasic Acid Content

| | Example | | | | | |
|---|---|---|---|---|---|---|
| | CC Example 5 | CC Example 6 | CC Example 7 | CC Example 8 | CC Example 9 | CC Example 10 |
| PE Example 7 | | | 64.00 | | | |
| PE Example 8 | | | | 64.00 | | |
| PE Example 9 | | | | | 64.00 | |
| PE Example 10 | | | | | | 64.00 |
| Setamine US138 | 59.80 | 59.80 | 59.80 | 59.80 | 59.80 | 59.80 |
| BYK 331* | 0.13 | 0.13 | 0.13 | 0.13 | 0.13 | 0.13 |
| BYK 306* | 0.13 | 0.13 | 0.13 | 0.13 | 0.13 | 0.13 |
| BYK 392* | 0.67 | 0.67 | 0.67 | 0.67 | 0.67 | 0.67 |
| Nacure 5414** | 5.37 | 5.37 | 5.37 | 5.37 | 5.37 | 5.37 |
| Setal 91760*** | 48.00 | 48.00 | 48.00 | 48.00 | 48.00 | 48.00 |
| Xylene | 6.72 | 6.72 | 6.72 | 6.72 | 6.72 | 6.72 |
| BGA | 6.72 | 6.72 | 6.72 | 6.72 | 6.72 | 6.72 |
| PMA/Butanol 50/50 | 11.72 | 11.72 | 11.72 | 11.72 | 11.72 | 11.72 |
| MAK | 6.72 | 6.72 | 6.72 | 6.72 | 6.72 | 6.72 |
| S150 | 6.72 | 6.72 | 6.72 | 6.72 | 6.72 | 6.72 |
| BA | 12.72 | 12.72 | 12.72 | 12.72 | 12.72 | 12.72 |
| UVA 1130 | 2.10 | 2.10 | 2.10 | 2.10 | 2.10 | 2.10 |
| HALS 123 | 1.05 | 1.05 | 1.05 | 1.05 | 1.05 | 1.05 |
| Clearcoat properties | | | | | | |
| König pendulum hardness, sec | 45 | 120 | 80 | 126 | 55 | 51 |
| Nanoscratch | | | | | | |
| Residual indent depth at 5N, μm | 5 | 7 | 6 | 8 | 6 | 5 |
| Fracture resistance, N | 8 | 14 | 12 | 13 | 10 | 10 |
| Nano-indentation hardness, MPa | 75 | 328 | 234 | 370 | 75 | 83 |

In the Table 4, BYK 331, BYK 306 and BYK 392 are coating system additives available commercially from BYK-Chemie GmbH. Nacure 5414 is a polymeric blocked sulfonic acid ester catalyst for use with amino crosslinking resins available commercially from King Inducties, Inc. Setal 91760 is SETALUX® 91760 SS-53 a thermosetting hydroxylated acrylic copolymer for combination with amino resins, modified with sag control agent available from Allnex. BGA is butyl glycol acetate. PMA is phorbol 12-myristate 13-acetate. MAK is Methyl n-Amyl Ketone. S150 is SOLVESSO 150 mixed solvent available from ExxonMobile Corporation. BA is n-butyl acetate. UVA 1130 is TINUVIN 1130 ultraviolet light absorber available from BASF. HALS 123 is TINUVIN 123, Hindered-Amine Light Stabilizers (HALS) available from BASF.

It is further anticipated that these polyester resins containing TMCD can be blended with an acrylic resin to improve the scratch resistance of the clearcoat while maintaining the beneficial performance attributes imparted by the acrylic resin. The acrylic resin may be hydroxyl functional or carbamate functional as desired.

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents. Moreover, all patents, patent applications, publications, and literature references presented herein are incorporated by reference in their entirety for any disclosure pertinent to the practice of this invention.

We claim:
1. A coating comprising:
   A. about 2 to about 50 weight percent, based on the total weight of (A), (B) and (C) of a curable, aliphatic polyester resin comprising:
      i. diacid residues, comprising at least 90 mole percent, based on the total moles of diacid residues, of the residues of at least one aliphatic diacid, wherein 0 to 40 mole percent of the at least one aliphatic diacid is an alicyclic diacid and 60 to 100 mole percent of the at least one aliphatic diacid is a linear diacid having between 4 and 12 carbons;
      ii. diol residues, comprising a) about 25 to 100 mole percent, based on the total moles of diol residues, of the residues of a diol having the structure:

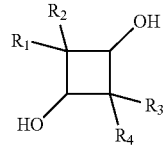

wherein R1, R2, R3, and R4 each independently represent an alkyl radical, and b) 0 to 75 mole percent based on the total moles of diol residues, of a C2-C20 diol selected from the group consisting of 2,2-dimethyl-1,3-propanediol, 1,2 cyclohexanedimethanol, 1,3-cyclohexanedimethanol, 1,4 cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, ethylene glycol, propylene glycol, diethylene glycol, dipropylene glycol, triethylene glycol, tetraethylene glycol, polyethylene glycol, and 2,2-bis(hydroxymethyl)propionic acid;
      iii. about 5 to about 80 mole percent of the residues of at least one polyol, based on the total moles of diol and polyol residues;
   B. about 15 to about 85 weight percent, based on the total weight of (A), (B), and (C) of at least one acrylic copolymer of ethylenically unsaturated monomers containing carbamate and/or hydroxy functional groups;
   C. about 10 to about 50 weight percent, based on the total weight of (A), (B), and (C), of at least one crosslinker comprising at least one compound reactive with a carbamate and/or hydroxyl group; and
   D. about 10 to about 60 weight percent, based on the total weight of (A), (B), (C), and (D) of at least one non-aqueous solvent.

2. The coating of claim 1 wherein the alicyclic diacid is a cyclic aliphatic dicarboxylic acid compound, its diester derivative, its anhydride, or a combination thereof.

3. The coating of claim 2 wherein the alicyclic diacid is selected from the group consisting of 1,4 cyclohexanedicarboxylic acid, 1,3 cyclohexanedicarboxylic acid, hexahydrophthalic anhydride, methyl hexahydrophthalic anhydride, tetrahydrophthalic anhydride, tetrachlorophthalic anhydride, 5-norbornene-2,3-dicarboxylic anhydride, 5-norbornene-2,3-dicarboxylic acid, 2,3-norbornanedicarboxylic acid, 2,3-norbornanedicarboxylic acid anhydride, and mixtures thereof.

4. The coating of claim 1 wherein said linear diacid is an open-chain aliphatic dicarboxylic acid compound, its diester derivative, its anhydride, or a combination thereof.

5. The coating of claim 4 wherein said linear diacid is selected from the group consiting of succinic acid, glutaric acid, adipic acid, itaconic anhydride, itaconic acid, citraconic anhydride, citraconic acid, pimelic acid, suberic acid, dodecanedioic acid, sebacic acid, azelaic acid, and combinations thereof.

6. The coating of claim 1 wherein said diol ii a) is selected from the group consisting of 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethyl-cyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol.

7. The coating of claim 1, wherein said polyol iii) is a saturated or unsaturated, aliphatic or cycloaliphatic C2-C20 compound.

8. The coating of claim 7 wherein said polyol is selected from the group consisting of 1,1,1-trimethylolpropane, 1,1,1-trimethylolethane, glycerin, pentaerythritol, erythritol, threitol, di-pentaerythritol, sorbitol, and mixtures thereof.

9. The coating of claim 1 wherein said crosslinker comprises at least one melamine compound chosen from hexamethoxymethyl melamine, tetramethoxymethyl benzoguanamine, tetramethoxymethyl urea, and mixed butoxy/methoxy substituted melamines.

10. A coating comprising:
A. about 2 to about 50 weight percent, based on the total weight of (A), (B) and (C) of a curable, aliphatic polyester resin, comprising:
  i. diacid residues, comprising at least 90 mole percent, based on the total moles of diacid residues, of the residues of 0 to 40 mole percent hexahydrophthalic anhydride and 60 to 100 mole percent is adipic acid;
  ii. diol residues, comprising a) about 25 to 100 mole percent, based on the total moles of diol residues, of the residues of 2,2,4,4-tetramethyl-1,3-cyclobutanediol, based on the total moles of diol residues and b) 0 to 75 mole percent based on the total moles of diol residues of neopentyl glycol; and
  iii. about 5 to about 80 mole percent of the residues of trimethylolpropane, based on the total moles of diol and polyol residues;
B. about 15 to about 85 weight percent, based on the total weight of (A), (B), and (C) of at least one acrylic copolymer of ethylenically unsaturated monomers containing carbamate and/or hydroxy functional groups;
C. about 10 to about 50 weight percent, based on the total weight of (A), (B), and (C), of at least one crosslinker comprising at least one compound reactive with a carbamate and/or hydroxyl group; and
D. about 10 to about 60 weight percent, based on the total weight of (A), (B), (C), and (D) of at least one non-aqueous solvent.

11. A coating comprising:
A. about 2 to about 50 weight percent, based on the total weight of (A), (B) and (C) of a curable, aliphatic polyester resin, comprising:
  i. diacid residues, comprising at least 90 mole percent, based on the total moles of diacid residues, of the residues of at least one aliphatic diacid where 0 to 40 mole percent is an alicyclic diacid and 60 to 100 mole percent is a linear diacid containing between 4 and 12 carbons;
  ii. diol residues, comprising a) 25 to 100 mole percent, based on the total moles of diol residues, of the residues of 2,2,4,4-tetramethyl-1,3-cyclobutanediol, based on the total moles of diol residues; and b) 0 to 75 mole percent based on the total moles of diol residues, of a C2-C20 diol selected from the group consisting of 2,2-dimethyl-1,3-propanediol, 1,2 cyclohexanedimethanol, 1,3-cyclohexanedimethanol, 1,4 cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, ethylene glycol, propylene glycol, diethylene glycol, dipropylene glycol, triethylene glycol, tetraethylene glycol, polyethylene glycol, and 2,2-bis(hydroxymethyl)propionic acid; and
  iii. about 5 to about 80 mole percent of the residues of at least one polyol selected from the group consisting of trimethylolpropane, pentaerythritol, trimethylolethane, erythritol, threitol, dipentaerythritol, sorbitol, and glycerine, based on the total moles of diol and polyol residues;
B. about 15 to about 85 weight percent, based on the total weight of (A), (B), and (C) of at least one acrylic copolymer of ethylenically unsaturated monomers containing carbamate and/or hydroxy functional groups;
C. about 10 to about 50 weight percent, based on the total weight of (A), (B), and (C), of at least one crosslinker comprising at least one compound reactive with a carbamate and/or hydroxyl group; and
D. about 10 to about 60 weight percent, based on the total weight of (A), (B), (C), and (D) of at least one non-aqueous solvent.

* * * * *